H. S. MOTT.
SHEAF GATHERER.
APPLICATION FILED MAR. 29, 1917.
1,324,017.
Patented Dec. 2, 1919.
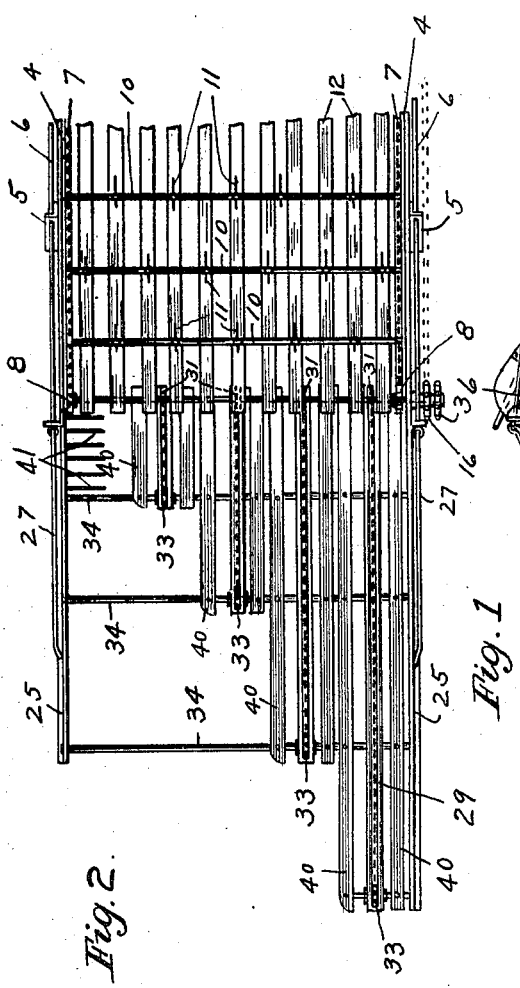
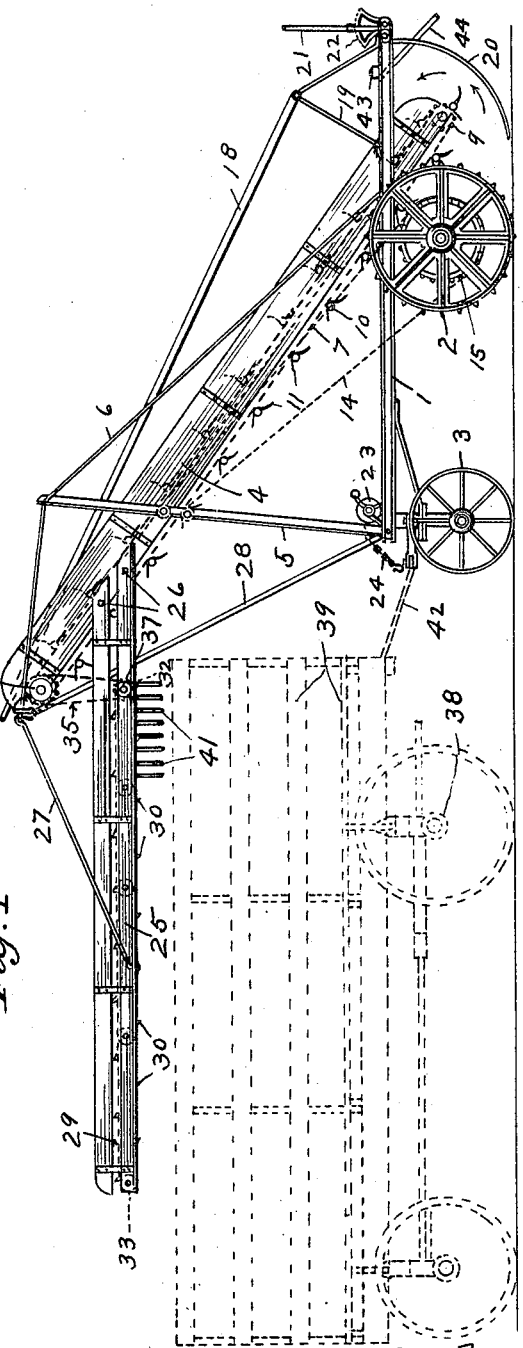
Inventor
HARLAND STUART MOTT

UNITED STATES PATENT OFFICE.

HARLAND STUART MOTT, OF MINNEAPOLIS, MINNESOTA.

SHEAF-GATHERER.

1,324,017.      Specification of Letters Patent.      Patented Dec. 2, 1919.

Application filed March 29, 1917. Serial No. 158,246.

*To all whom it may concern:*

Be it known that I, HARLAND STUART MOTT, a citizen of the United States, resident of Minneapolis, county of Hennepin, State of Minnesota, have invented certain new and useful Improvements in Sheaf-Gatherers, of which the following is a specification.

The object of my invention is to provide an apparatus by means of which sheaves or bundles of grain can be easily and quickly gathered up from the ground, elevated and delivered to a rack or wagon.

A further object is to provide an apparatus by means of which the sheaves or bundles can be distributed from end to end of the receiving rack.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of a sheaf gatherer and loader embodying my invention, Fig. 2 is a plan view of the distributing portion of the apparatus.

In the drawing, 1 represents a suitable frame, having carrying wheels 2 and 3. 4 is an elevating apron frame, forwardly and upwardly inclined above the frame 1 and supported thereon by upright bars 5 and truss rods 6. 7 represents sprocket chains engaging sprocket wheels 8 and 9 mounted in the frame 4 and 10 are rods mounted on said chains and extending transversely of the apron frame and having pick-up fingers 11 pivoted at intervals thereon. 12 represents a slatted bottom of the apron frame over which the sheaves are raised by the movement of the apron belt. 14 is a drive belt from the gear 15 on the wheel 2 and 16 is a sprocket wheel for the belt 14 through which power is transmitted to operate the shaft on the sprocket wheels 8 and drive the apron. 18 represents rods pivotally supported on brackets 19 at the rear end of the frame 1 and positioned to overhang the apron frame and rest upon the sheaves and hold them down on the belt during the elevating operation. These rods will also prevent the sheaves from toppling backward down the inclined belt.

At the rear end of the frame 1, I prefer to provide sheaf gathering teeth 20 operated by means of a lever 21 on a quadrant 22. At the front of the frame 1 is a windlass 23 having a connection 24 for attachment to the draft connection 42 for drawing the machine up to a point where the connection can be easily made.

Near the top of the apron frame I provide a supplementary distributing frame 25 secured at 26 to the main frame and projecting forwardly and horizontally therefrom to overhang the receiving rack or wagon. Brace rods 27 are preferably pivoted at one end of the frame 25 and have hooked opposite ends to engage the upper end of the apron frame and serve as a means for supporting the distributing frame in a horizontal position. I also prefer to provide brace bars 28 extending from the forward portion of the frame 1 upwardly to the underside of the apron frame to aid in rigidly supporting it and the distributing frame.

Within the distributing frame I provide distributing belts 29 having teeth 30 and operating over sprocket wheels 31 at the upper end of the apron frame at the rear end of the distributing frame and similar wheels 33 at the opposite end of said frame. Rods 34 are mounted at intervals in the frame 25, each having sprocket wheels 33 thereon for belts 29 and bars 40 are secured to said rods between said belts and form a deck over which the bundles are moved by the action of the sprocket belts. These bars 40 vary in length and the distributing belts 29 are also of different length across the machine, so that the bundles as the belts move them along will be distributed from end to end of the rack instead of being discharged into one place therein and then have to be moved about and distributed by hand.

On one side of the distributing frame I prefer to provide a series of downwardly and inwardly projecting fingers 41 which have the function of delivering the outer sheaves of the elevating apron downwardly and inwardly to the receiving rack.

In the operation of picking up the sheaves of grain between the pick-up teeth and the rake teeth 20, it sometimes happens that the bundles will be gathered up and thrust end first toward the angle between the frame of the machine and the rake teeth and to avoid wedging or lodging of the bundles in this space I provide a bar 43 on the rear of the frame having the downwardly and rearwardly projecting arms 44 thereon which extend between the rake teeth 20 and serve as guides for directing the bundles upwardly on the apron and preventing them from wedging in the angle between the frame and the rake teeth.

I make no claim in this case to the inclined elevator frame and the gathering apron mounted therein, as it forms the subject matter of a companion application Serial No. 158,245, hay loaders, filed March 29, 1917.

I claim as my invention:

1. A sheaf gatherer, comprising a frame having carrying wheels, an apron frame forwardly and upwardly inclined therein, a gathering apron for said apron frame, a distributing frame forming a horizontal continuation of said apron frame and comprising side rails and cross rods between them, slats of varying length secured to said cross rods and spaced apart, the slats at one side of said distributing frame extending to a point near the forward end of a wagon box stationed beneath said frame and the slats at the other side of said distributing frame terminating near the opposite end of said wagon box, conveyer belts operating between said slats and also of varying length for distributing the bundles across the wagon box and from end to end thereof.

2. A sheaf gatherer comprising a frame having carrying wheels, an apron frame forwardly and upwardly inclined therein, a gathering apron for said apron frame, a distributing frame forming a horizontal continuation of said apron frame, a drive shaft for said gathering apron mounted in the upper portion of said apron frame, belts having driving connections with said shaft and extending in said distributing frame lengthwise thereof, said belts being of varying length for distributing the bundles across a wagon box positioned beneath said distributing frame and from end to end thereof.

3. A sheaf gatherer comprising a frame having carrying wheels, an apron frame forwardly and upwardly inclined therein and a gathering apron operating in said frame, a distributing frame forming a horizontal continuation of said apron frame for overhanging a wagon box positioned beneath said distributing frame, a distributing means operating in said distributing frame for delivering the bundles to the wagon box from end to end thereof, and a series of fingers provided at one side of said frame for directing the bundles from said apron inwardly with respect to said wagon box.

4. A sheaf gatherer comprising a frame having carrying wheels, an apron frame forwardly and upwardly inclined therein, a gathering apron for said apron frame, a distributing frame forming a horizontal continuation of said apron frame and adapted to overhang a wagon box positioned beneath said distributing frame, a series of conveyer belts mounted in said distributing frame and operating lengthwise thereof, said belts being of varying length from one side of said distributing frame to the other, the longest belt operating to deliver the sheaves to the end of the wagon box remote from said apron frame and the remaining belts distributing the sheaves in said box from said remote end to the end thereof adjacent said apron frame.

In witness whereof, I have hereunto set my hand this 24th day of March, 1917.

HARLAND STUART MOTT.